United States Patent
Shibahara

(10) Patent No.: US 8,164,805 B2
(45) Date of Patent: Apr. 24, 2012

(54) IMAGE READING APPARATUS AND IMAGE FORMING APPARATUS THEREWITH

(75) Inventor: Masami Shibahara, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 374 days.

(21) Appl. No.: 12/480,898

(22) Filed: Jun. 9, 2009

(65) Prior Publication Data

US 2009/0316231 A1 Dec. 24, 2009

(30) Foreign Application Priority Data

Jun. 19, 2008 (JP) ................................. 2008-160407

(51) Int. Cl.
*H04N 1/04* (2006.01)
(52) U.S. Cl. .......................... 358/475; 358/474; 358/468
(58) Field of Classification Search ........................ None
See application file for complete search history.

(56) References Cited

U.S. PATENT DOCUMENTS

| 6,316,767 | B1* | 11/2001 | Paxton et al. | 250/234 |
| 6,433,895 | B1* | 8/2002 | Hansen | 358/475 |
| 6,784,410 | B2* | 8/2004 | Ishizuka | 250/208.1 |
| 2008/0278774 | A1* | 11/2008 | Enami et al. | 358/475 |

FOREIGN PATENT DOCUMENTS

| JP | 63253371 A * | 10/1988 |
| JP | 5-333627 | 12/1993 |
| JP | 10-75335 | 3/1998 |
| JP | 2005-318067 | 11/2005 |

* cited by examiner

*Primary Examiner* — Cheukfan Lee
(74) *Attorney, Agent, or Firm* — Smith, Gambrell & Russell, LLP

(57) ABSTRACT

An image reading apparatus includes: a lamp shining light on a target original document to be read; a lamp operating circuit for turning on the lamp; an image sensor receiving light shone from the lamp to the original document and reflected from the original document, for generating image data; a control section outputting a lamp control signal for controlling turning-on and -off of the lamp to the lamp operating circuit; and a lamp control circuit, separate from the control section, outputting a lamp control signal for controlling turning-on and -off of the lamp and, when a main power switch of the apparatus is turned on, permitting the lamp to be turned on before the control section is activated.

9 Claims, 9 Drawing Sheets

IMAGE READING APPARATUS AND IMAGE FORMING APPARATUS THEREWITH

This application is based on Japanese Patent Application No. 2008-160407 filed on Jun. 19, 2008, the contents of which are hereby incorporated by reference.

BACKGROUND OF THE INVENTION

1. Field of the Invention

The present invention relates to an image reading apparatus such as a scanner that reads an original document. The present invention also relates to an image forming apparatus equipped with such an image reading apparatus.

2. Description of Related Art

There are image reading apparatuses reading an original document and then outputting image data thereof. Image forming apparatuses such as copiers, multi-functional apparatuses, and facsimiles are equipped with an image reading apparatus for a copying or scanning purpose. Typically, the image reading apparatus includes a lamp that shines light on an original document, that guides the light reflected from the original document into an image sensor, and that then obtains image data. Despite the fact that the image reading apparatus needs such light emission from the lamp, that lamp may not emit the amount of light necessary for performing a reading operation or there may be nonuniformity in the amount of light (for example, in one case where the main power switch is turned off on a previous day and turned on at the start of working on the next day, and in another case where the image reading apparatus has been placed in a low temperature environment for a long period of time with its main power switch remaining off) for one reason that the lamp is not yet warmed up right after the main power switch is turned on or other reasons. That is, reading of an image cannot be performed immediately after the main power switch is turned on; thus, it is necessary to wait until the amount of light emitted from the lamp is stabilized.

The technology coping with the inconvenience of requiring much time before the amount of light emitted from the lamp is stabilized is disclosed in JP-A-2005-318067. More specifically, JP-A-2005-318067 discloses an image forming apparatus including: a cold cathode light source; means for regulating an amount of light emitted from the light source; driving means for driving an optical system in a sub-scanning direction; a plurality of image sensors each converting light into an electrical image signal; an A/D converter converting the image signal into a digital signal; means for transferring the image signal thus digitally converted to an external device; means for reading a peak value of the digitally converted image data; means for performing calibration every time an image reading operation is performed; means for performing the image reading operation using calibration data stored in a memory and the like, without performing the calibration every time; and means for switching between the means for performing the calibration every time the image reading operation is performed and the means for performing the image reading operation without performing the calibration every time, wherein when the cold cathode light source is unstable on being turned on, the means for performing the image reading operation without performing the calibration every time is not selectable. With this configuration, it was intended to provide a scanner capable of preventing the image reading operation from being performed while the cold cathode light source is unstable (see claim 1 and paragraph [0008] of JP-A-200-318067).

As described earlier, so that in an image reading apparatus, the amount of light emitted from a lamp incorporated therein reaches a desired level and is stabilized, that lamp needs to be preliminarily turned on for a certain period of time and to be warmed up. Now, a conventional example of controlling turning-on of a lamp when a main power switch is turned on will be described with reference to FIG. 9 (for a case where a cold cathode lamp is used for the lamp). FIG. 9 is a timing chart showing one example of an operation when a main power switch of a conventional image reading apparatus is turned on.

First, in the chart, the topmost line indicates, as an example, an output voltage value for a main power switch (power supply device) of a copier (in FIG. 9, the main power switch is turned on at timing A'). The second line indicates when a control board starts operating, the control board being responsible for controlling the image reading apparatus (in FIG. 9, the operating starts at timing B'). More specifically, when the main power source is turned on, the power supply device generates a voltage for operating the control board, the CPU starts operating, a control program is read from a memory, and the CPU of the control board executes that program; in this way, start-up processes are executed including setting-up of a CPU port and the like. Through these processes, the lamp is put under control to be turned on (at timing B').

Conventionally, turning-on of the lamp is controlled by a control board, and as indicated by the third line in the chart, after the control board starts operating, a lamp control signal (remote signal) becomes High so that the lamp is warmed up (the signal being transmitted from the control board at timing C' in FIG. 9). At that time, as indicated by the lowermost line in FIG. 9, a cold cathode lamp is turned on. After the illumination starts at the timing C', the CPU and the like starts counting an illumination time, and the amount of light emitted from the cold cathode lamp reaches a desired level and is stabilized (at timing D' in FIG. 9). When the cold cathode lamp becomes stable, automatic adjusting functions for the reading operation such as shading correction are performed (between D' and E'). Thus, in the example shown in FIG. 9, the image reading apparatus can be used only when a time period A'-E' (represented by a time TA in the figure) has elapsed after the main power switch is turned on.

Typically, the amount of light emitted from the lamp is not stabilized immediately (for example, in the case of a cold cathode lamp, it takes approximately several tens of seconds if it is cooled). A time before the control board starts operating added to a time before the amount of light emitted from the lamp is stabilized makes a user waiting time long. That is, the waiting time before the amount of light emitted from the lamp of the image reading apparatus is stabilized inconveniently prevents shortening of the time from when the main power switch is turned on until when the apparatus is ready for a reading operation or, for a case where the image reading apparatus is incorporated in an image forming apparatus, a time before a first copying can be performed (from turning-on of the main power switch to the first copying).

Certainly, with the scanner disclosed in JP-A-20050318067, reading of images with density problems or images with poor S/N ratios may be avoided in some cases (see paragraph [0006] of JP-A-2005-318067); however, what is attained by the technology disclosed therein is simply making the means for performing the image reading operation without performing the calibration every time unselectable; consequently, the reading operation is still permitted even when there is nonuniformity in the amount of light emitted from the lamp, with the adverse effect that image data thus obtained is basically of poor quality. Moreover, with respect to the above-identified inconveniences, the conventional technology is not intended to positively cope with reducing a user waiting time. In fact, so long as the amount of light emitted from a lamp is stabilized right after the main power switch is turned on, there is no need to practice the technology disclosed in JP-A-2005-318067.

SUMMARY OF THE INVENTION

In view of the above-described inconveniences, the present invention has an object to warm up a lamp as soon as possible after a main power switch of an image reading apparatus or an image forming apparatus is turned on, so that an amount of light emitted from the lamp reaches a desired level and is stabilized, thereby to contribute to reducing a user waiting time and hence increasing user-friendliness.

To achieve this object, an image reading apparatus according to a first aspect of the present invention includes: a lamp shining light on a target original document to be read; a lamp operating circuit for turning on a lamp; an image sensor receiving the light shone from the lamp to the original document and then reflected from the original document, for generating image data; a control section outputting a lamp control signal to the lamp operating circuit thereby to perform control of turning-on and off of the lamp; and a lamp control circuit, separate from the control section, outputting a lamp control signal for controlling turning-on and -off of the lamp to the lamp operating circuit and, when a main power switch of the apparatus is turned on, permitting the lamp to be turned on before the control section is activated.

With this configuration, when the main power switch is turned on, the lamp control circuit permits the lamp to be turned on before the control section is activated; thus, the lamp can be warmed up, thereby to make the amount of light emitted therefrom reach a desired level and stabilized immediately. As a result of the amount of light emitted from the lamp being thus stabilized immediately, the apparatus is allowed fast to proceed to automatic adjusting control (including shading correction and gain adjustment) preceding performing of the image reading. Thus, it is possible to put the image reading apparatus in a usable state quickly, with no adverse effect of degraded quality of read image data, and hence, it is possible to reduce a user waiting time after the main power switch is turned on.

To achieve the above-described object, an image forming apparatus according to a second aspect of the present invention is provided with: an image reading apparatus and a fixing section, the image reading apparatus including: a lamp shining light on a target original document to be read; a lamp operating circuit for turning on the lamp; an image sensor receiving the light shone from the lamp to the original document and reflected from the original document, for generating image data; a control section outputting a lamp control signal for controlling turning-on of the lamp to the lamp operating circuit; and a lamp control circuit, separate from the control section, outputting a lamp control signal for controlling turning-on and -off of the lamp to the lamp operating circuit and, when a main power switch of the apparatus is turned on, permitting the lamp to be turned on before the control section is activated, the fixing section, provided with a temperature detecting member having an output voltage variable in accordance with a temperature detected thereby, and fixing a toner image transferred to a sheet by being heated and pressed, wherein the output voltage of the temperature detecting member is inputted to the lamp control circuit, and when a main power switch of the apparatus is turned on, the lamp control circuit, when recognizing that the temperature detected by the temperature detecting member exceeds a predetermined temperature, does not permit the lamp to be turned on. With this configuration, the amount of light emitted from the lamp is stabilized immediately; thus, it is possible to provide an image forming apparatus offering a reduced time before first copying. Moreover, a fixing apparatus (the fixing section), provided with a heater, fixes a toner image by being heated therewith; accordingly, the fixing apparatus needs to perform temperature control thereby to check whether it has reached a fixable temperature and to prevent it from being extremely hot and thus needs to include a temperature detecting member. Here, the use of the temperature detecting member provided in the fixing section makes it possible to accomplish, with that member alone, decision-making of whether or not the lamp needs to be turned on so as to be warmed up when the main power switch is turned on, and detection of a temperature in the fixing apparatus. This leads to reduced costs of manufacturing the image forming apparatus.

As described above, according to the present invention, it is possible to provide an image reading apparatus and image forming apparatus capable of warming up a lamp thereof immediately after a main power switch thereof is turned on and thus offering a reduced time before reading of an image or first copying can be performed.

BRIEF DESCRIPTION OF THE DRAWINGS

FIG. 6 is a timing chart showing, by way of example, operations of the image reading apparatus according to the first embodiment when a main power switch thereof is turned on;

FIG. 9 is a timing chart showing, by way of example, operations of a conventional image reading apparatus when a main power switch thereof is turned on.

DETAILED DESCRIPTION OF PREFERRED EMBODIMENTS

Hereinafter, a first embodiment of the present invention will be described with reference to FIGS. 1 to 7. A configuration, arrangement and the like shown in this embodiment are not meant to limit the scope of the invention and are construed as illustrative only.

[Outline of an Image Forming Apparatus]

Figure 1:
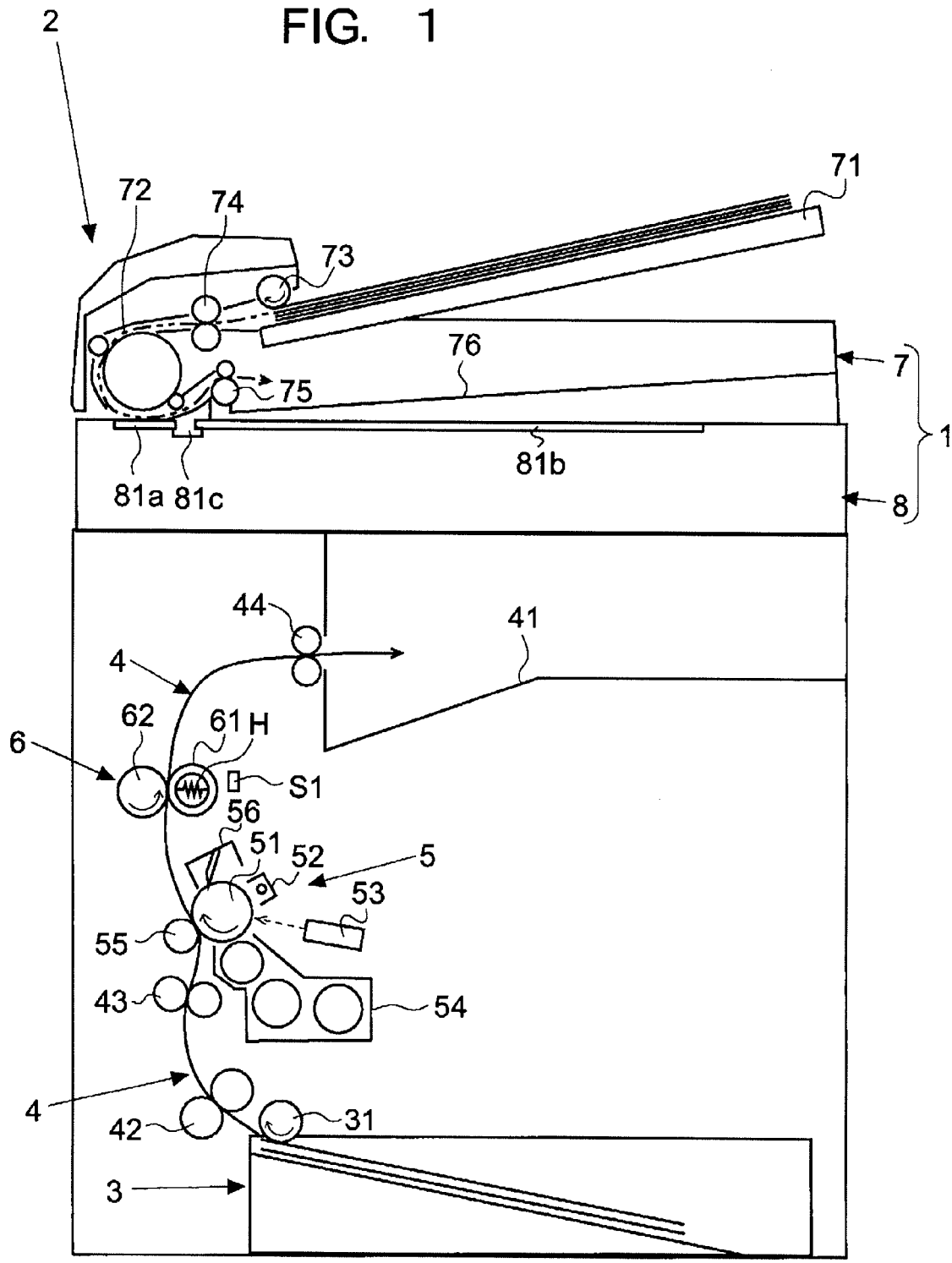
FIG. 1 is a model cross sectional view schematically showing, by way of example, a configuration of a copier according to a first embodiment, when seen from the front.
Figure 2:
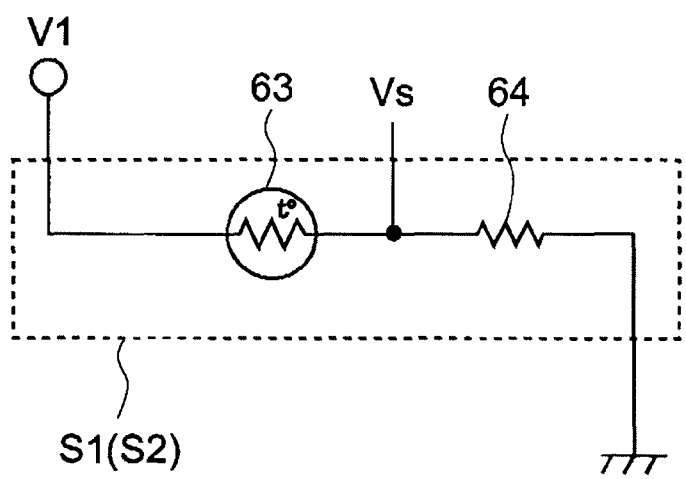
FIG. 2 is a circuit diagram showing, by way of example, a temperature sensor according to the first embodiment.

First, an outline of an electrophotography type copier 2 (corresponding to an image forming apparatus) equipped with an image reading apparatus 1 according to the first embodiment of the present invention will be described with reference to FIGS. 1 and 2. FIG. 1 is a model cross sectional view schematically showing, by way of example, a configuration of a copier 2 according to the first embodiment of the present invention, when seen from the front. FIG. 2 is a circuit diagram showing, by way of example, a temperature sensor S1 (corresponding to a temperature detecting member) according to the first embodiment of the present invention.

As shown in FIG. 1, in the copier 2 of this embodiment, the image reading apparatus 1 is disposed at the top thereof. The image reading apparatus 1 is composed of an original document conveying section 7 conveying an original document thereon, an image reading section 8 disposed below the original document conveying section 7 and shining light on the original document and then reading it with the light reflected therefrom, and the like. The image reading apparatus 1 will be described in detail later.

Next, an internal configuration and operation of the copier 2 will be described. The copier 2 incorporates: a sheet feeding section 3; a sheet conveyance passage 4; an image forming section 5; a fixing section 6, and the like, and has an ejected sheet space formed below the image reading section 8. These constituent components will be described in order along a sheet conveying passage. Incidentally, in FIG. 1, an arrowed solid line represents a sheet conveyance passage inside the copier 2.

First, the sheet feeding section 3 is disposed at the bottom of the copier 2, and contains various kinds of sheets including copying paper, OHP sheets and label sheets with different sizes (A4, B5, etc.). A sheet feeding roller 31 is disposed on a downstream side, in a sheet conveyance direction, of the sheet feeding section 3. The sheet feeding roller 31 makes contact with an uppermost sheet and is so driven as to rotate in a predetermined direction (clockwise in FIG. 1) during sheet feeding and thereby to feed one sheet after another into the sheet conveyance passage 4.

In this embodiment, the sheet conveyance passage 4 conveys a sheet inside the copier 2, namely conveys a sheet from the sheet feeding section 3 to an ejected sheet tray 41 via the image forming section 5. The sheet conveyance passage 4 is provided with a pair of conveying rollers 42 rotated by a driving mechanism (not shown); a plurality of guide plates (not shown) for guiding a sheet; a pair of resist rollers 43; and a pair of ejecting rollers 44 for ejecting a sheet.

The image forming section 5, disposed at a left side of the copier 2 in FIG. 1, forms a toner image, based on image data inputted in the copier 2, an original document read by the image reading apparatus 1 and the like, and then transfers it onto a sheet. The image forming section 5 is composed of a photoconductive drum 51 serving as an image carrying member, a charging apparatus 52, an exposing apparatus 53, a developing apparatus 54, a transfer roller 55, a cleaning apparatus 56, and the like. The photoconductive drum 51 is disposed substantially in the center of the image forming section 5, is so driven as to rotate in a predetermined direction (clockwise in FIG. 1) by a driving apparatus (not shown), and has a photoconductive layer formed of such as an amorphous silicon on its outer peripheral surface. The charging apparatus 52 is disposed diagonally to the right upward of and opposite the photoconductive drum 51, and electrically charges a peripheral surface of the photoconductive drum 51. Incidentally, apart from a corona discharging type, a charging roller, brush or the like may be used.

The exposing apparatus 53 is disposed on a right side of the photoconductive drum 51 and the charging apparatus 52 in FIG. 1, shines light on the peripheral surface of the photoconductive drum 51 after being electrically charged, based on the image data, and then scans and exposes the peripheral surface with that light. Thus, an electrostatic latent image corresponding to the image data is formed on the peripheral surface of the photoconductive drum 51. The developing apparatus 54 is disposed below the photoconductive drum 51 in FIG. 1, electrically charges a toner with a predetermined polarity, and then supplies that toner to the electrostatic latent image. In this way, the electrostatic latent image is developed as a toner image.

The transferring roller 55 is rotatably supported diagonally to the left downward of the photoconductive drum 51 in FIG. 1, and transfers the toner image formed on the photoconductive drum 51 to a sheet. To this end, the transferring roller 55 forms a nip by abutting on the photoconductive drum 51. Subsequently, when the toner image and a sheet are inserted in the nip, a voltage with a polarity opposite to that of the toner is applied to the transferring roller 55, and thereby the toner image is transferred to the sheet. In FIG. 1, the cleaning apparatus 56 is disposed above the photoconductive drum 51, and removes and collects the part of the toner or dust left on the peripheral surface of the photoconductive drum 51.

In this embodiment, the fixing section 6 is composed of a heating roller 61 incorporating a heat generating member H and a pressing roller 62, and fixes the toner image on the sheet by being heated and pressed therewith. The heating roller 61 and pressing roller 62 make press-contact with each other, thereby to form a nip. The sheet having the toner image transferred thereon is inserted in that nip, so that toner fixing is performed there. After the fixing is completed, the sheet is then ejected on the ejected sheet tray 41.

As shown in FIG. 1, the fixing section 6 may be provided with a temperature sensor S1 (corresponding to a temperature detecting member). To detect a temperature of the heating roller 61, the temperature sensor S1 may be disposed in the vicinity of the heating roller 61 (to the left in FIG. 1). That is, the temperature sensor S1 whose output voltage varies in accordance with a temperature detected thereby is provided. The temperature sensor S1 may be of either contact type or non-contact type. In respect of implementing the present invention, the temperature sensor S1 is used not only for monitoring a temperature of the fixing section 6 but also for determining whether or not a lamp 88 of the image reading section 8 is cooled (this will be described in detail later). Moreover, a temperature sensor S2 may be additionally disposed in the vicinity of the lamp 88 for determining whether or not the lamp 88 of the image reading section 8 is cooled (see FIG. 3). To determine whether or not the lamp 88 of the image reading section 8 is cooled, it is sufficient to use either the temperature sensor S1 or S2; in this embodiment, an example in which the temperature sensor S1 is used will be described.

[Configuration of the Temperature Sensor S1]

Next, an example of the temperature sensor S1 will be described with reference to FIG. 2. As shown in FIG. 2, the temperature sensor S1 of this embodiment may be formed as a series circuit including a thermistor 63 and a resistor 64. A predetermined voltage V1 is applied to one end, on a side of the thermistor 63, of the series circuit, whereas a ground is connected to the other end, on a side of the resistor 64, of the series circuit. That is, the voltage V1 is applied to the series circuit, and a voltage across the thermistor 63 and the resistor 64 is obtained as an output voltage Vs of the temperature sensor S1. In the temperature sensor S1 of this embodiment, the higher a temperature is, the smaller a resistance value of the thermistor 63 is; accordingly, a current increases and the output voltage Vs rises. On the other hand, the lower the temperature is, the greater the resistance value of the thermistor 63 is; accordingly, the output voltage Vs drops.

[Configuration of the Image Reading Apparatus 1]

Figure 3:
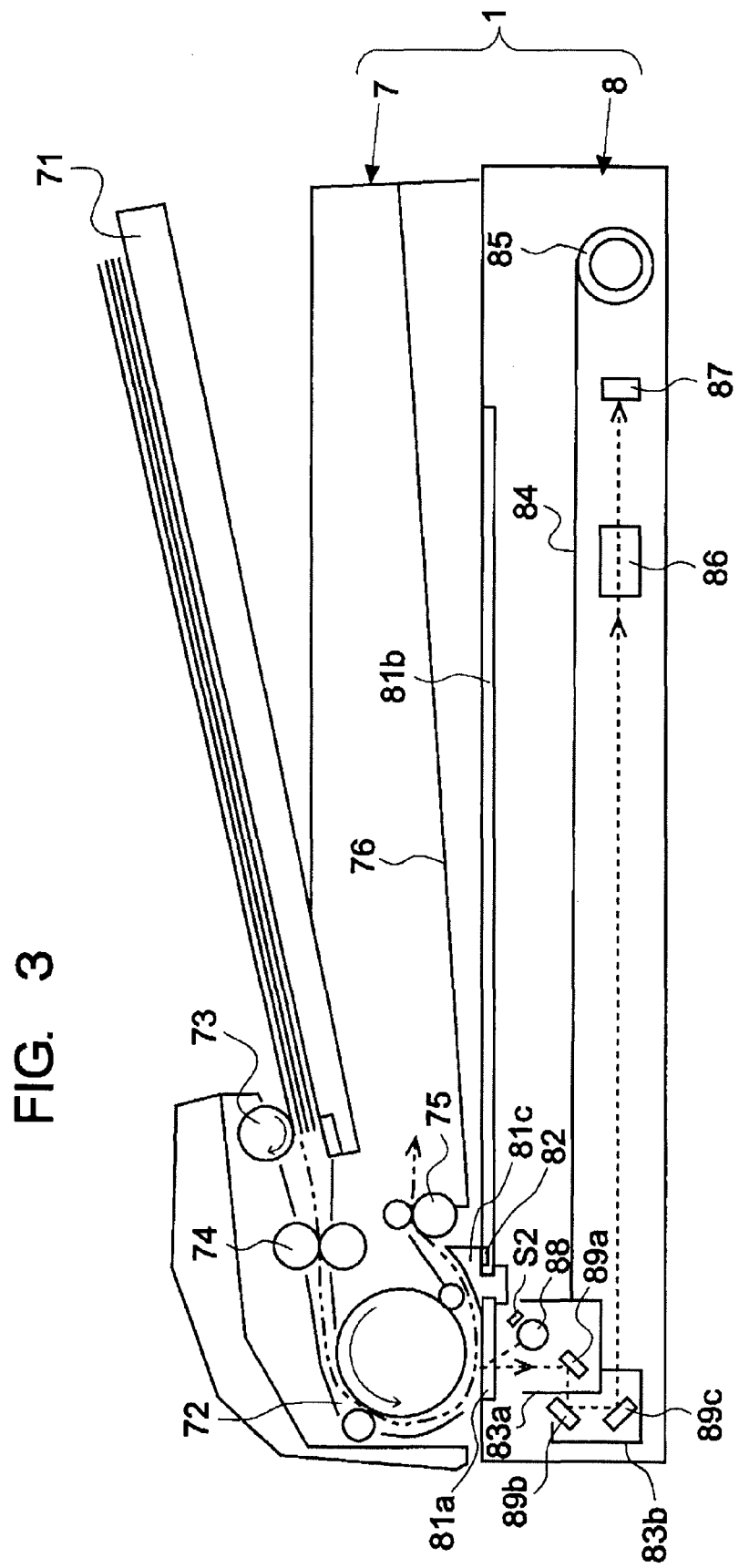
FIG. 3 is an enlarged model cross sectional view of an image reading apparatus according to the first embodiment.

Next, the image reading apparatus 1 according to the first embodiment of the present invention will be described with reference to FIG. 3. FIG. 3 is an enlarged model cross sectional view of the image reading apparatus 1 of the copier 2 according to the first embodiment of the present invention.

First, the original document conveying section 7 will be described. The original document conveying section 7 automatically and continuously performs conveying of an original document to which a reading operation is performed, and includes: in order from an upstream side in an original document conveyance direction, an original document tray 71; an original document conveyance passage 72; an original document feeding roller 73; a pair of original document conveyance rollers 74; a pair of original document ejecting rollers 75; an ejected original document tray 76, and the like. Moreover, the original document conveying section 7 is disposed above the image reading section 8 openably with respect to the image reading section 8 with a portion, at the far side of FIG. 3, of the section 7 serving as a fulcrum, and functions as a cover pressing, from above, contact glasses of the image reading section 8 (a contact glass 81*a* for "conveyance" reading and a contact glass 81*b* for "placement" reading).

The original document tray 71 can hold a plurality of original documents placed thereon, and is connected to an upstream-side end of the original document conveyance passage 72. The original document feeding roller 73 makes contact with the uppermost original document and, when an input that indicates starting of reading or copying an original document is entered, feeds an original document into the original document conveyance passage 72. The original document so fed is conveyed by the pair of the original document conveying rollers 74, and then passes on an upper surface of the contact glass 81*a* for "conveyance" reading provided on an upper surface of the image reading section 8. Meanwhile, the image reading section 8 performs a reading operation. An original document that has been read thereby is ejected from the pair of ejected original document rollers 75 to the ejected original document tray 76 (the original document conveyance passage being represented by a dash-dot-dot line in the figure).

Next, the image reading section 8 of this embodiment will be described. As shown in FIGS. 1 and 3, the image reading section 8 of this embodiment has a housing formed in a box-like shape. On the upper surface of the image reading section 8, the contact glass 81*a* for "conveyance" reading and the contact glass 81*b* for "placement" reading, each formed in a plate-like shape, are arranged in order from left in FIG. 3. On a lower side of a guide 81*c* between the contact glass 81*a* for "conveyance" reading and the contact glass 81*b* for "placement" reading, a white-color plate 82 is disposed for use in shading correction in the image processing section 97, which will be describe later. The white-color plate 82 is formed out of resin and the like.

The contact glass 81*a* for "conveyance" reading is a surface on which an original document conveyed by the original document conveying section 7 passes, and below the contact glass 81*a*, a first and a second moving frame 83*a* and 83*b*, which will be described later, are so stopped and reading of an original document is performed there. On the other hand, the contact glass 81*b* for "placement" reading is a surface on which, for a case where sheets of an original document such as a book or newspaper are read one after another, they are placed with surfaces to be read facing down after the original document conveying section 7 is raised. On the contact glass 81*b* for "placement" reading, reading of an original document is performed by moving the first and second moving frames 83*a* and 83*b* horizontally from their home positions to the right in FIG. 3 using a winding drum 85, which will be described later, or the like.

As shown in FIG. 3, inside the housing of the image reading section 8 are disposed the first and second moving frames 83*a* and 83*b*, a plurality of wires 84, a winding drum 85, a lens 86, an image sensor 87 for receiving light shone from the lamp 88 onto the original document and reflected from the original document and generating image data. The first moving frame 83*a* holds, in its upper portion, the lamp 88 (a cold cathode lamp in this embodiment) shining light on a target original document to be read and, in its lower portion, a first mirror 89*a*. The second moving frame 83*b* holds, in its upper portion, a second mirror 89*b* and, in its lower portion, a third mirror 89*c*. The first moving frame 83*a* is located above the second moving frame 83*b*. Moreover, to the first and second moving frames 83*a* and 83*b*, the wires 84 are attached with one end thereof connected to the winding drum 85. The winding drum 85 can be rotated forward and backward by use of a driving mechanism (not shown) including a motor, gears and the like, and thereby the first and second moving frames 83*a* and 83*b* can be freely moved horizontally. Although as the wires 84, a single wire is shown in FIG. 3, in reality several wires are stretched between each of the moving frames and the winding drum 85, so that the moving frames are freely moved to the left and right in FIG. 3.

In this embodiment, the lamp 88 held in the first moving frame 83*a* is a cold cathode lamp disposed below the contact glass 81*a* for "conveyance" reading and the contact glass 81*b* for "placement" reading, the lamp so formed as to be laid out in a direction perpendicular to a document plane in FIG. 3. The first to third mirrors 89*a* to 89*c* are also so formed as to be laid out in the direction perpendicular to the document plane in FIG. 3, and a material with a high reflective index is applied thereon.

Now, an original document reading operation will be described specifically by way of example. First of all, reading of an original document being conveyed by the original document conveying section 7 will be described. An original document fed from the original document tray 71 is first conveyed while passing on the upper surface of the contact glass 81*a* for "conveyance" reading. Then, the first and second moving frames 83*a* and 83*b* are placed in positions below the contact glass 81*a* for "conveyance" reading, and there the lamp 88 shines light on the original document passing thereabove.

The light emitted from the lamp 88 reaches the original document on the contact glass 81*a* for "conveyance" reading, and the first mirror 89*a* receives and reflects the light reflected from the original document to the left side of the image reading section 8, the second mirror 89*b*, being disposed on an optical path of that light, receives and reflects the light downward, and then the third mirror 89*c*, being disposed on the optical path, receives and reflects the light to the right side of the image reading section 8. After that, the reflected light collected by the lens 86 passes through the image sensor 87 composed of a CCD line sensor and the like, and is then converted into an analog electrical signal corresponding to a density of an image of the original document. Reading of the original document is performed on a line basis in a main scanning direction (in a direction perpendicular to the original document conveyance direction), and such line-based reading is repeatedly performed in a sub-scanning direction (in the original document conveyance direction), thereby to accomplish reading of one sheet of the original document.

On the other hand, when an original document placed on the contact glass 81*b* for "placement" reading is read, an scanning operation is continuously performed with the first and second moving frames 83a and 83b being moved to the right side of the image reading section 8 (rightward in FIG. 3) by use of the winding drum 85, the wires 84 and the like until they come to the side of the original document sequentially; in this way, the entire original document is read, and an image of that original document is then converted into an electrical signal.

[Hardware Configuration]

Figure 4:
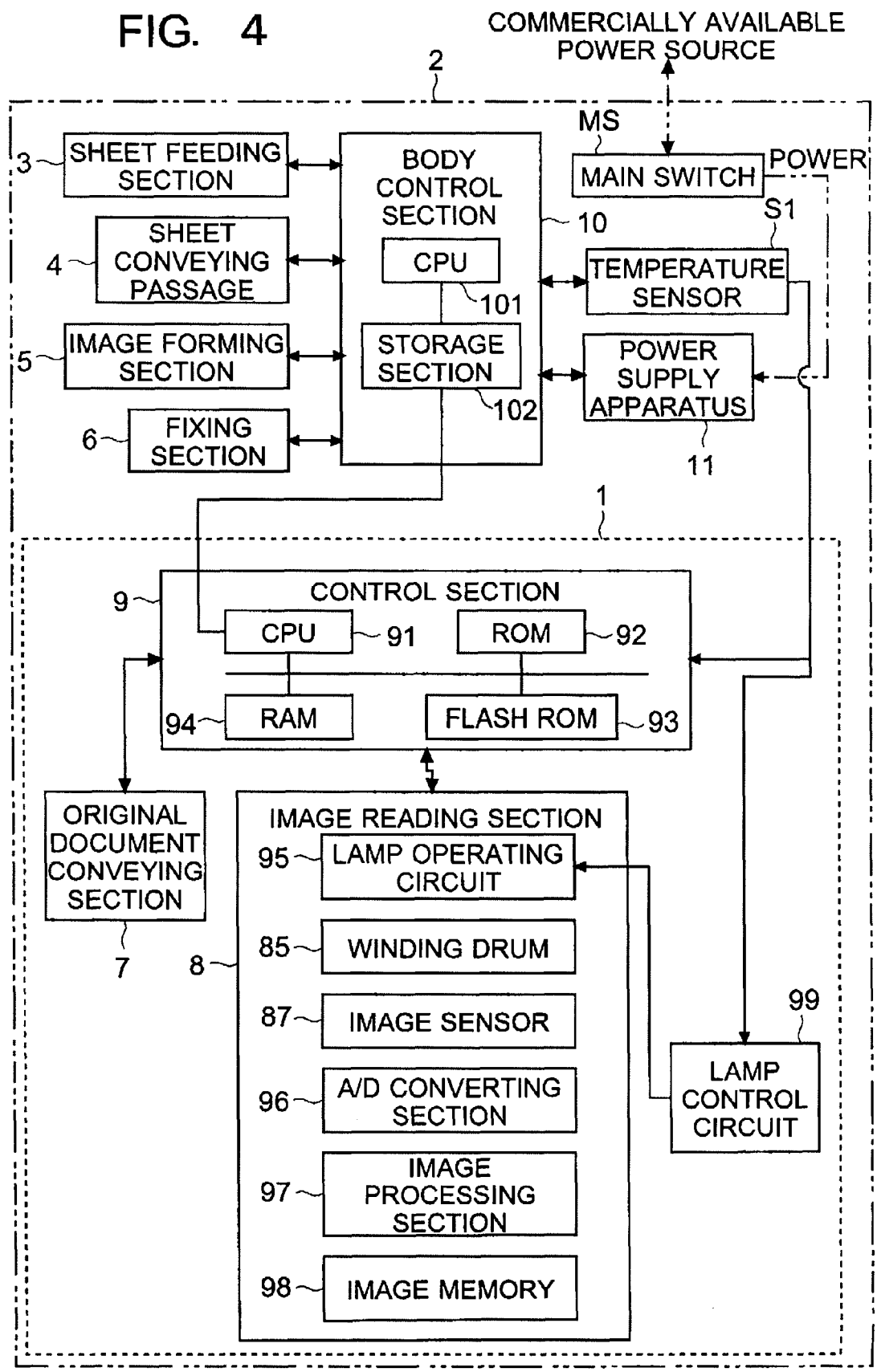
FIG. 4 is a block diagram showing a copier including the image reading apparatus according to the first embodiment.

Next, hardware configurations of the image forming apparatus and image reading apparatus 1 according to the first embodiment of the present invention will be described specifically by way of example with reference to FIG. 4. FIG. 4 is a block diagram showing the copier 2 including the image reading apparatus 1 according to the first embodiment of the present invention.

First, as shown in FIG. 4, in the copier 2 of this embodiment, two control boards, namely a control section 9 in the image reading apparatus 1 and a body control section 10 are provided: the control section 9 outputs, to a lamp operating circuit 95, which will be described later, a lamp control signal for controlling operations of the original document conveying section 7 and the image reading section 8 and controlling turning-on and -off of the lamp 88, and the body control section 10 controls image forming processes, sheet conveyance, temperature of the heating roller 61 and the like.

The body control section 10 is provided with a CPU 101 as a central processing nit, and includes a storage section 102 composed of volatile and non-volatile memories such as a RAM (random access memory), ROM (read-only memory), HDD (hard disk drive), and flash ROM. The storage section 102 can store programs and data necessary for performing various kinds of control such as temperature control of the heating roller 61, and image data that has been read by the image reading apparatus 1.

The sheet feeding section 3, sheet conveying passage 4, image forming section 5, and fixing section 6 are connected to the body control section 10, and respective operations of the sections just mentioned are controlled by the body control section 10. Moreover, an output of the temperature sensor S1 is inputted to the body control section 10. Note that the output of the temperature sensor S1 is also inputted to a lamp control circuit 99 of the image reading apparatus 1, which will be described later.

Also, the control section 9 of the image reading apparatus 1 is provided with, as a central processing unit, a CPU 91 and, as storage devices, a ROM 92, flash ROM 93, RAM 94 and the like. The ROM 92 and flash ROM 93 are non-volatile memories in which programs and data necessary for performing control of the image reading apparatus 1 are stored. The RAM 94 is a volatile memory in which programs and data for performing control of the image reading apparatus 1 are expanded. The control section 9 is connected to the body control section 10, and for example when an input indicating starting of copying is entered in the copier 2, receives an instruction from the body control section 10 and then performs control of operations of the image reading apparatus 1 accordingly.

To the control section 9 are connected constituent components forming the image reading section 8, specifically the lamp operating circuit 95 for practically turning on the lamp 88 of the image reading section 8, the winding drum 85, and the image sensor 87. When the reading of an original document is performed, the control section 9 performs control of the respective members thereby to turn on the lamp 88, to move each of the moving frames by use of the wiring drum 85, to activate the image sensor 87, and then to obtain analog image data. In addition, the image reading section 8 incorporates: an A/D converting section 96 converting the analog electrical signal so obtained into a digital signal; an image processing section 97 performing image processing on the digital image data so obtained; and an image memory 98 for retaining the image data. The image data inside the image memory 98 is sent to the body control section 10, and moreover, the image data after undergoing the image processing is used for exposure in the exposing apparatus 53 or is stored in an HDD and the like of the storage section 102

The A/D converting section 96 converts an analog signal of an original document, which is outputted from the image sensor 87, into a digital signal. The A/D converting section 96 samples and holds the analog signal, performs quantization in accordance with the magnitude of an output of the analog signal, and thereby obtains a density value (graduation value) for each pixel. Thus, a digital image data is obtained. As the case may be, the A/D converting section 96 may be provided with a function of amplifying the analog signal outputted from the image sensor 87. Moreover, an amplifier circuit may be provided in a stage preceding the A/D converting section 96.

The image processing section 97 is a section in which the image processing is performed on the read image data (image data after undergoing A/D conversion). Incidentally, there are various kinds of image processing; here, among them, in respect of the image processing section 97, simply image processing involved in automatic adjustment of the reading operation will be described, and no description will be given of the other kinds of processing, to which publicly known techniques can be applied.

For example, the image processing involved in automatic adjustment of the reading operation includes shading correction and gain adjustment. Shading correction refers to correction in which, for a case where even if the same original document is read, a density value obtained therefrom for each pixel may differ depending on what sort of an object it contains and/or a position of that pixel, an error is corrected with the aforementioned white-color plate 82 serving as a white-color reference. For example, let a density value (gradation value) of each pixel when the white-color plate 82 is read used as a correction coefficient; a density value after correction is calculated for each of the pixels forming the image data read thereafter by applying, for example, the following equation {a density value after correction=a density value before correction×(maximum density value (e.g., 255)/a density value when the white-color plate 82 is read)}; thus, a density value is corrected. Moreover, for example in a case where a raw output value of the image sensor 87 is small and thus needs to be amplified by the A/D converting section 96 and the like, a rate of this amplification is set in the gain adjustment. Note that the setting up and processing involved in the automatic adjustment of the reading operation are done after the main power switch is turned on and the amount of light emitted from the lamp 88 is stabilized, so that they are accomplished appropriately.

The lamp operating circuit 95 is a circuit for practically turning on the lamp 88 shining light on an original document. The lamp operating circuit 95 is provided with an inverter and the like; however, there is no particular restriction on a circuit configuration thereof, and any configuration is acceptable so long as to turn on the lamp 88 such as a cold cathode lamp. The control section 9 performs control of the operations of the lamp operating circuit 95 thereby to control turning-on and -off of the lamp 88.

Separately from the control section 9, the lamp control circuit 99 is provided as a circuit outputting, to the lamp operating circuit 95, a lamp control signal for performing control of turning-on and -off of the lamp 88. In particular, the lamp control circuit 99 can turn on the lamp 88, when the main power switch is turned on, without relying on the control of the control section 9, and forms a circuit separate from the control section 9. Thus, upon turning-on of the main power switch, the image reading apparatus 1 of this embodiment can turn on the lamp 88 without waiting for activation of the control section 9.

Inside the copier 2, the power supply apparatus 11 is disposed and connected to the body control section 10, and the body control section 10 performs control of driving the power supply apparatus 11 and simultaneously monitors an output voltage thereof and the like. The power supply apparatus 11 is connected to a commercially available power source via a main switch MS for switching-on and -off of the main power switch, and generates various voltages required in the copier 2 by rectifying, boosting, bucking, and the like. For example, the power supply apparatus 11 generates a voltage (e.g., DC 24 V) to be fed into a motor rotating each of the rotating members such as the original document conveying section 7, image reading section 8, sheet feeding section 3, sheet conveying passage 4, image forming section 5, and fixing section 6. Moreover, the power supply apparatus 11 generates voltages (e.g., 5 V and 3.3 V) for driving, for example, circuit elements forming the body control section 10 and the control section 9 and feeds them thereto. Further, the power supply apparatus 11 generates a voltage V1 applied to the temperature sensor S1, a voltage used in the lamp control circuit 99 (e.g., V2 and V3, which will be described later) and a voltage for turning on the lamp 88, and feeds the temperature sensor S1, lamp control circuit 99, and lamp operating circuit 95. Incidentally, to avoid increased complexity of the drawing in FIG. 4, no rendering is given in connection with power supply from the power supply apparatus 11.

[Configuration of the Lamp Control Circuit]

Figure 5:
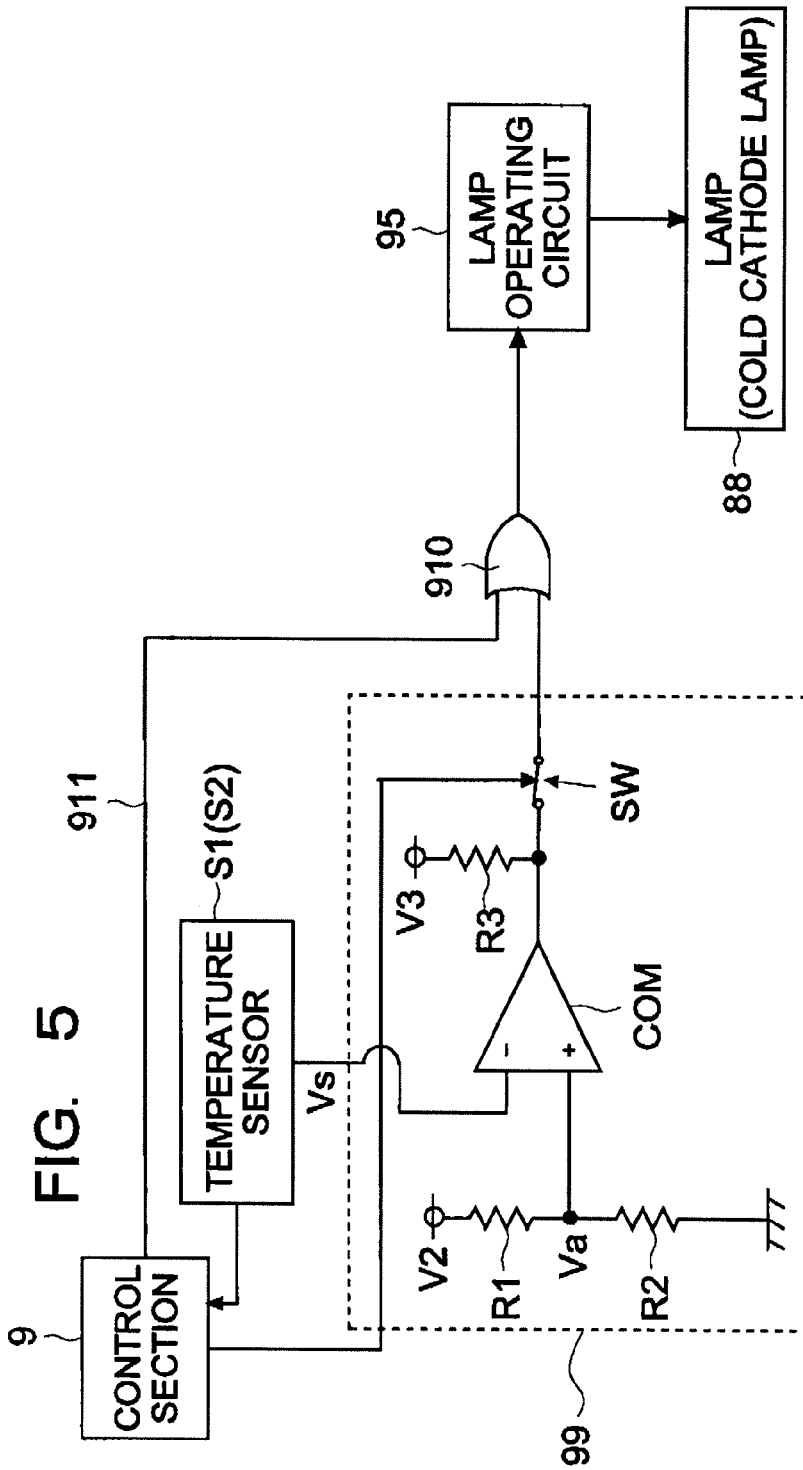
FIG. 5 is a circuit diagram showing, by way of example, a lamp control circuit according to the first embodiment.

An example of the lamp control circuit 99 according to the first embodiment of the present invention will be described with reference to FIG. 5. FIG. 5 is a circuit diagram showing an example of the lamp control circuit 99 according to the first embodiment of the present invention.

In FIG. 5, a portion surrounded by a dotted line is the lamp control circuit 99. When the main power switch is turned on, the lamp control circuit 99 determines whether or not, after the main power switch of the copier 2 has been turned off, the lamp 88 is too cold to reach a desired amount of light even if it is turned on (whether or not a certain time has passed) and, when recognizing that the lamp 88, even if turned on, will not emit the desired amount of light, the lamp control circuit 99 permits the lamp 88 to be turned on before the CPU 91 starts up and the control section 9 is activated.

Conventionally, turning-on of the lamp 88 was controlled by the control section 9 (or the body control section 10) alone; thus, it was not until the control section 9 and CPU 91 started up, a program was read from the ROM 92, and the control section 9 and body control section 10 were activated so as to set a port or the like, that the lamp 88 was turned on for the warming-up purpose, and it took approximately several tens of seconds to several minutes from when the main power switch was turned on until the amount of light emitted from the lamp 88 is stabilized. By contrast, in the image reading apparatus 1 of this embodiment, when the main power switch is turned on, if the lamp control circuit 99 recognizes that the lamp 88 is cold, the lamp control circuit 99 permits the lamp 88 to be immediately turned on so as to be warmed up.

On the other hand, when the main power switch is turned on, if the lamp control circuit 99 recognizes that the lamp 88 is not yet cooled because not so much time has passed since the main power switch of the copier 2 was turned off, there is no need to turn on the lamp 88 before activating the control section 9. For example, when the copier 2 is stopped due to an error or the like, the main power switch is, as is often the case, turned off and on within a short time; in such a case, the lamp 88 is not yet cooled, and the amount of light emitted therefrom is stabilized.

Accordingly, when the main power switch is turned on, the lamp control circuit 99 determines whether or not the lamp 88 is completely cooled using an internal temperature of the apparatus measured by the temperature sensor S1. Here, the lamp control circuit 99 may determine that much time has passed since the main power switch was turned off and that the lamp 88 is cooled, without directly measuring a temperature of the lamp 88. To this end, in this embodiment, an output voltage Vs of the temperature sensor S1 for detecting a temperature of the heating roller 61 in the fixing section 6 is used. This makes it possible to use a sensor for determining that the lamp 88 is cooled in combination with the temperature sensor S1 for detecting a temperature of the heating roller 61.

More specifically, the lamp control circuit 99 is composed of a comparator COM and a reference voltage generating section. The output voltage Vs of the temperature sensor S1 is inputted to a negative terminal of the comparator COM. That is, the output voltage Vs of the temperature sensor S1 is inputted to the lamp control circuit 99. As shown in FIG. 5, the output voltage Vs of the temperature sensor S1 is, from a viewpoint of management of a temperature of the fixing section 6 and the like, also inputted to the control section 9 and body control section 10. Specifically, the reference voltage generating section is a series circuit composed of two resistors R1 and R2, of which one end receives a predetermined voltage V2 and of which the other end is connected to a ground, with a voltage across the resistors R1 and R2 inputted, as a reference voltage Va, to a positive terminal of the comparator COM. Thus, the comparator COM compares the output voltage Vs of the temperature sensor S1 with the reference voltage Va generated separately, and then determines whether or not a temperature so detected by the temperature sensor exceeds a predetermined temperature.

The reference voltage Va serves as a reference for determining whether or not to permit the lamp control circuit 99 to turn on the lamp 88 when the main power switch is turned on. That is, the aforementioned predetermined temperature is determined in accordance with the reference voltage Va. For example, suppose that a sufficient amount of light cannot be obtained even if the lamp 88 is turned on when the temperature of the heating roller 61 falls below 100° C.; when a value of the output voltage Vs of the temperature sensor S1 for the temperature of the fixing section 6 being 100° C. is known, and the reference voltage Va is generated using a voltage dividing ratio between the two resistors R1 and R2 so that the reference voltage Va is equal to Vs, the comparator COM can determine whether or not the temperature of the fixing section 6 is 100° C. or higher. Thus, in this case, the predetermined temperature is 100° C. In other words, the reference voltage Va serves as a threshold value for determining whether or not the lamp control circuit 99 permits the lamp 88 to be turned on. That is, the lamp control circuit 99 determines whether or not to permit the lamp 88 to be turned on in accordance with a result of the determination made by the comparator COM, and moreover, the predetermined temperature can be set up as necessary by changing the reference voltage Va. Note that the comparator COM here is of an open collector type, of which an output terminal is connected to a pull-up resistor R3 and a voltage V3 is applied thereto.

The reference voltage Va can be individually set up in consideration of the model of the image forming apparatus, the kind, length, diameter and characteristics of the lamp 88, the type of the fixing section 6, an amount of heat generated by a heater of the heating roller 61, and the like; thus, it is preferable that experiments or the like be conducted so as to find out how much the temperature of the heating roller 61 falls after the main power switch is switched off result in the lamp 88 no longer emitting the desired amount of light, and that the reference voltage Va be then determined in correspondence with that temperature of the heating roller 61.

An output terminal of the comparator COM is connected to one end of an OR circuit 910; accordingly, when an output of the comparator COM (lamp control circuit 99) is High, an output of the OR circuit 910 is High. The lamp operating circuit 95 turns on the lamp 88 when the output of the OR circuit 910 is High, and turns off the lamp 88 when it is Low. That is, when the output of the comparator COM is High, the lamp 88 is turned on. Moreover, the other end, serving as an input terminal, of the OR circuit 910 is connected to the control section 9 through a lamp control line 911.

To turn on the lamp 88 for performing normal reading operations including copying and scanning, or shading correction and the like, the control section 9 sets the lamp control line 911 (lamp control signal) to High. That is, when the lamp 88 is turned on, the control section 9 sets the lamp control line 911 to High, and when the lamp 88 is turned off, the control section 9 sets the lamp control line 911 to Low. The OR circuit 910 is so disposed as to receive two inputs, namely a lamp control signal of the control section 9 and a lamp control signal of the lamp control circuit 99, and an output of the OR circuit 910 is inputted to the lamp operating circuit 95.

Now, an output of the lamp control circuit 99 will be described. First, as described earlier, the output voltage Vs of the temperature sensor S1 is increasingly low as a detected temperature is low. When the temperature of the heating roller 61 is lower than a temperature defined by the reference voltage Va (predetermined temperature), the output of the comparator COM is High. With this, the lamp 88 starts illuminating. In other words, when the temperature of the heating roller 61 is lower than the temperature defined by the reference voltage Va, the lamp 88 is considered to be cooled; thus, the lamp control circuit 99 outputs the lamp control signal so as to permit the lamp 88 to be turned on.

For example, a switch SW may be provided between the output terminal of the comparator COM and the OR circuit 910. Normally, the switch SW is in a state of connecting the output terminal of the comparator COM and the OR circuit 910, and with the control signal from the control section 9, the switch SW disconnect them. This provision is for a case where the copier 2 may be provided with a low power consumption mode (e.g., a sleep mode), in which when a no-use condition continues for a predetermined time, the temperature of the heating roller 61 is lowered or power supply to a heating member H is stopped. In the low power consumption mode, when the temperature of the heating roller 61 is lowered, there are occasions when the lamp control circuit 99 unnecessarily turns on the lamp 88. For this reason, in the low power consumption mode, the control section 9 blocks, using the switch SW, transmission of a signal from the lamp control circuit 99 to the OR circuit 910 (to put the lamp control circuit 99 in a disabled state). Meanwhile, the control section 9 sets the lamp control line 911 to Low thereby to prevent the lamp 88 from being turned on. Incidentally, this is only an example showing how the operation of the lamp control circuit 99 is stopped, and it may be practiced in any way other than that mentioned above.

As described above, the lamp control circuit 99 forms a circuit separate from the control section 9 and is in a system separate from the control section 9. Accordingly, when the main power switch is turned on after the copier 2 is placed in a low temperature environment for a long period of time, the lamp 88 starts illuminating without being controlled by the control section 9. Thus, the amount of light emitted from the lamp 88 reaches a desired level as quickly as possible. Moreover, when the lamp 88 is not yet cooled, such the immediate turning-on of the lamp 88 is not implemented, resulting in achievement of low power consumption.

[Operation of the Image Reading Apparatus 1 on Turning on the Main Power Switch]

Figure 6:
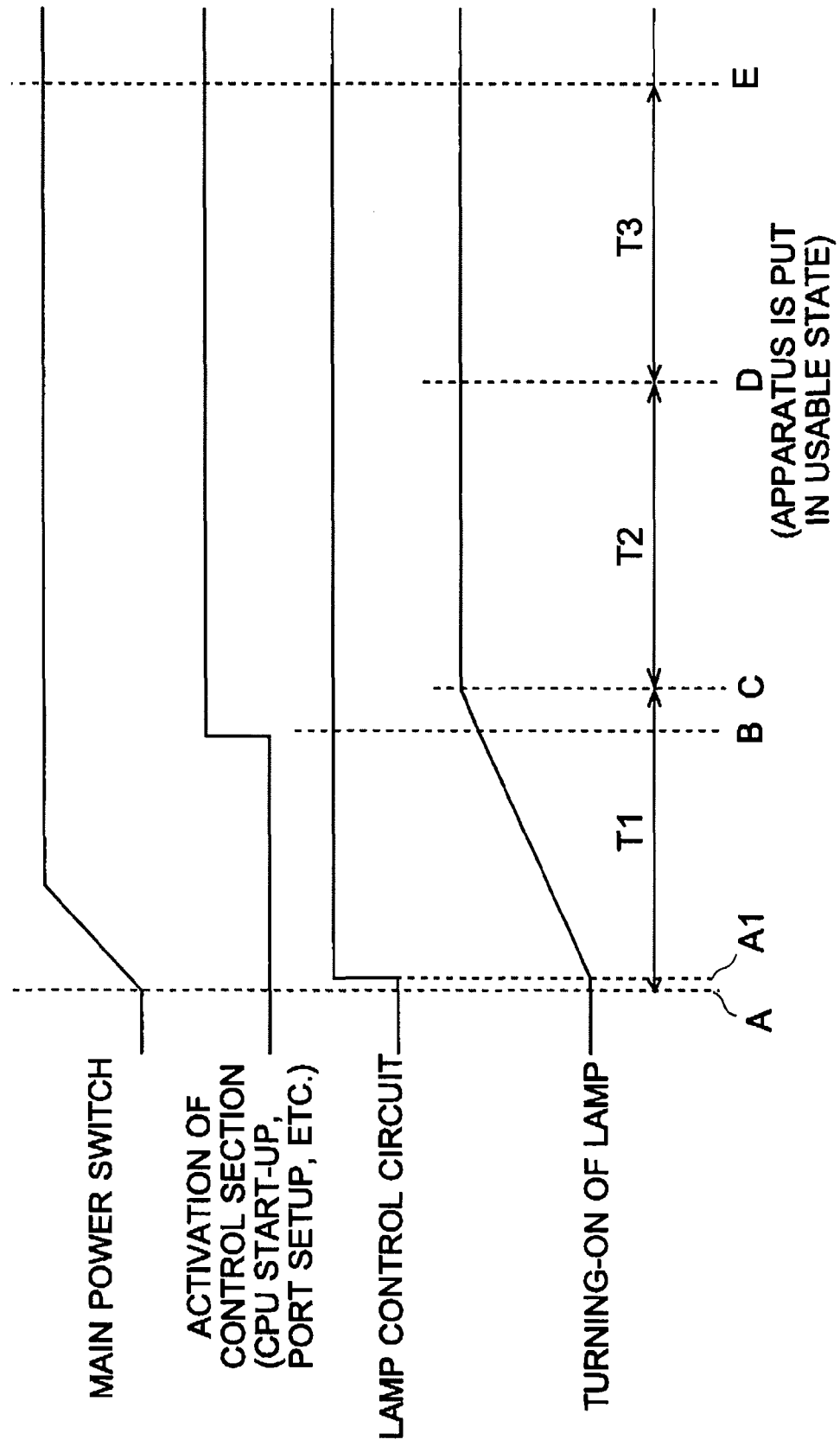

Next, in respect of the image reading apparatus 1 according to the first embodiment of the present invention, an example of its operation when the main power switch is turned on will be described with reference FIG. 6. FIG. 6 is a timing chart showing, by way of example, how the image reading apparatus 1 according to the first embodiment of the present invention operates. In this example, a case where the lamp 88 is completely cooled is the focus.

First, the topmost line in the chart indicates when the main power switch of the copier 2 is turned on and off. In FIG. 6, the main power switch of the copier 2 is turned on at timing A. The second line from the top indicates when the control section 9 is activated. After the main power switch is turned on, various settings including starting-up of the CPU 91 and the like are completed, and at timing B, the control section 9 starts performing various control and communications with the body control section 10. The third line from the top in the chart indicates the output of the lamp control circuit 99. When the lamp 88 is cooled, the output of the lamp control circuit 99 in this embodiment, being in a system separate from the control section 9, becomes High immediately after the main power switch is turned on (at timing A1 in FIG. 6).

The lowermost line in the chart indicates when the lamp 88 is turned on. In this chart, the lamp 88 starts illuminating at the same timing as the output of the lamp control circuit 99 transitions to High (at the timing A1 in FIG. 6). Thus, the starting of illumination of the lamp 88 precedes the activation of the control section 9, which is completed at the timing B. After the lamp 88 starts illuminating at the timing A1, the amount of light emitted therefrom reaches a desired level at the timing C and is stabilized.

From the timing shown in FIG. 6 when the amount of light emitted from the lamp 88 is stabilized, the automatic adjusting functions for performing the reading operation such as the shading correction and the like are set up (between C and D). Thus, in the example shown in FIG. 6, after a time period A-C (represented by a time T1) and a time period C-D (represented by a time T2) elapses, namely at timing D the image reading apparatus 1 is in a usable state.

Figure 9:
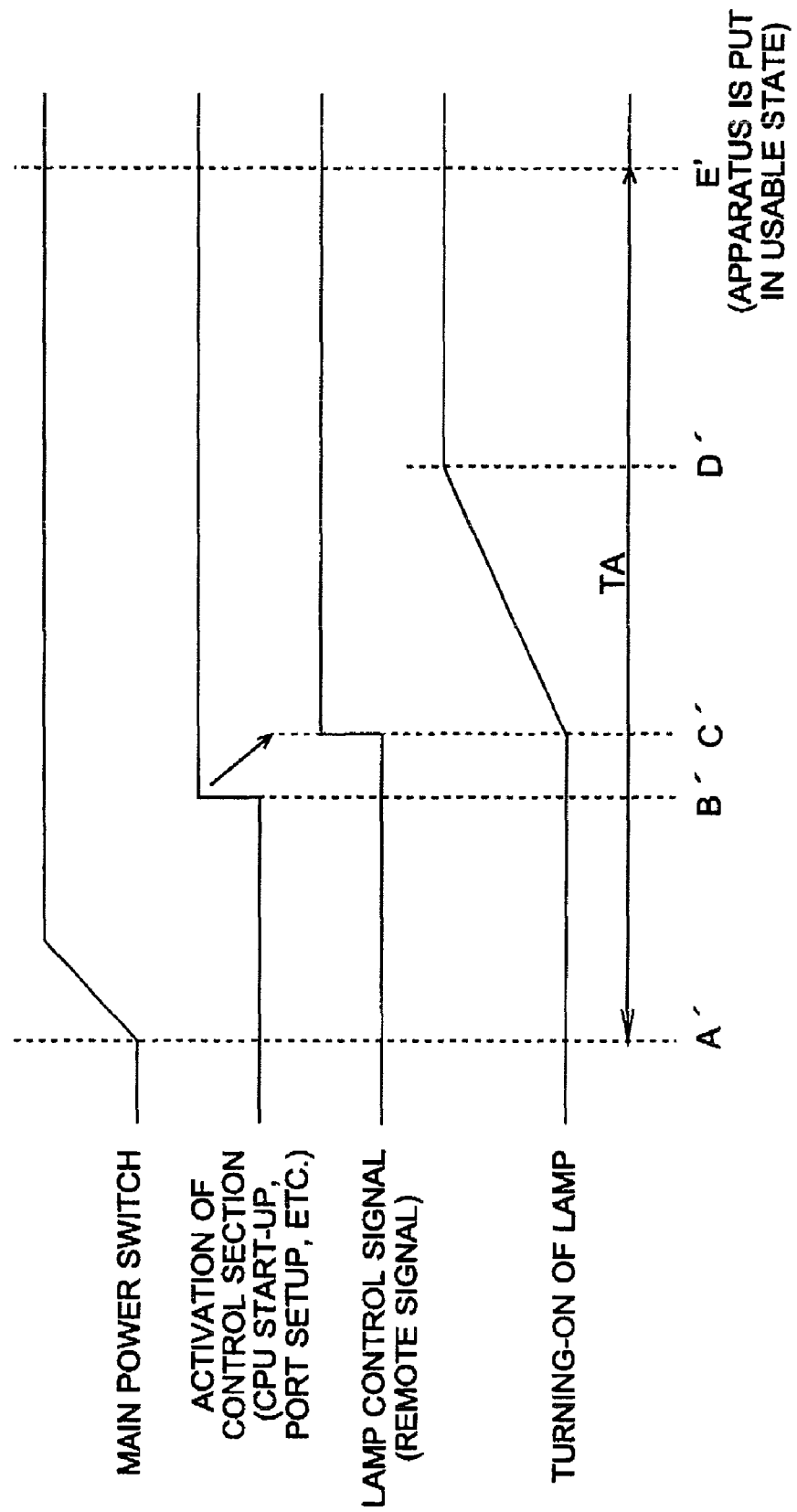

Timing E shown in FIG. 6 serves as a guide for a case where the turning-on of the lamp 88 is not performed under the control described here, namely a guide for an image reading apparatus in a conventional example shown in FIG. 9 being put in the usable state. More specifically, according to this embodiment, a time before the image reading apparatus (copier) becomes in the usable state is shortened by a time period D-E (represented by a time T3) (when seen in FIG. 9, a time period A'-C' is removed). Depending on factors such as a time required for activating the control section 9, the kind of a lamp used for the lamp 88, and outputs, a shortened time is varied; for example, in a case where a cold cathode lamp is used, a time before the image reading apparatus 1 becomes in the usable state can be shortened by approximately 10 to 40 seconds, more precisely at least 10 to 20 seconds.

(Control for Starting-Up the Image Reading Apparatus)

Figure 7:
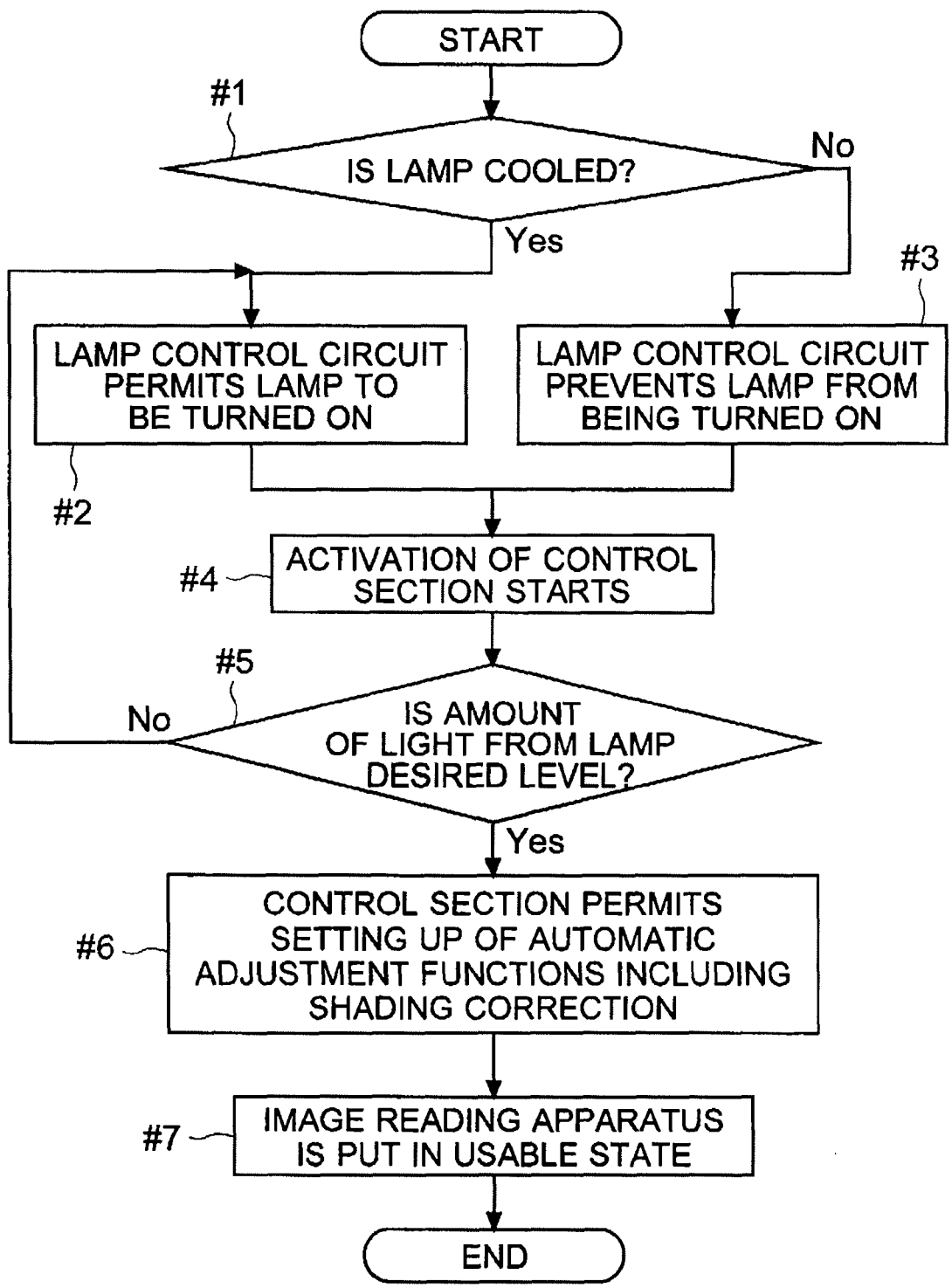
FIG. 7 is a flow chart showing, by way of example, control processes for starting-up of the image reading apparatus when the main power switch is turned on according to the first embodiment.

Next, in respect of the image reading apparatus 1, how starting-up control when the main power switch is turned on is performed according to the first embodiment of the present invention will be described in summary with reference to FIG. 7. FIG. 7 is a flow chart showing, by way of example, control for the starting-up of the image reading apparatus 1 when the main power switch is turned on according to the first embodiment of the present invention.

First, in FIG. 7 "Start" signifies the main power switch being turned on. Next, the lamp control circuit 99 determines, based on the output from the temperature sensor S1, whether or not the lamp 88 is cooled (step #1). When the lamp 88 is cooled (Yes in step #1), because it needs to be warmed up so as to stabilize the amount of light emitted therefrom, it is turned on (step #2). That is, when the main power switch of the apparatus is turned on, the lamp control circuit 99 permits the lamp 88 to be turned on before the control section 9 is activated. On the other hand, when the lamp control circuit 99 does not recognize, based on the output from the temperature sensor S1, that the lamp 88 is cooled (No in step #1), the lamp control circuit 99 does not permit the lamp 88 to be turned on (step #3). That is, the lamp control circuit 99, when recognizing that a temperature detected by the temperature sensor S1 exceeds a predetermined temperature, does not permit the lamp 88 to be turned on.

Subsequently, the control section 9 is activated and starts operating (step #4), and after the main power switch is turned on, when the control section 9 starts operating, for example completing the starting-up of the CPU 91, etc., the control section 9 checks the output of the temperature sensor S1; when recognizing that the temperature detected by the temperature sensor S1 exceeds the predetermined temperature, the control circuit 9 determines that the amount of light emitted from the lamp 88 reaches a desired level (step #5). Or, when the turning-on of the lamp 88 is performed by the lamp control circuit 99, the control section 9 may check if a predetermined period of time has elapsed since the main power switch is turned on or the control section 9 is activated so as to confirm that the amount of light emitted from the lamp 88 reaches a desired level.

As a result of the determination made in step #1 being No, the control section 9 determines that the amount of light reaches the desired level (Yes in step #5). When the amount of light emitted from the lamp 88 does not reach the desired level (No in step #5), for example, the flow returns to step #2 (in this case, the control section 9 may be responsible for turning on the lamp 88 for a predetermined period of time). On the other hand, the control section 9, when recognizing that the amount of light emitted from the lamp 88 reaches the desired level (Yes in step #5), proceeds to set up the automatic adjusting functions including the shading correction (step #6) and to put the image reading apparatus 1 in the usable state (from step #7 to End). Accordingly, when based on the output from the temperature sensor S1, the lamp 88 is considered to be warmed up, when the main power switch is turned on, the lamp control circuit 99 is responsible for preventing the lamp 88 from being unnecessarily turned on, and when the control section 9 has already been activated, the control section 9 is responsible for doing so.

As described above, with the configuration of this embodiment, when the main power switch is turned on, the lamp control circuit 99 permits the lamp 88 to be turned on before the control section 9 is activated; thus, the lamp 88 (e.g., a cold cathode lamp) can be warmed up thereby to make an amount of light emitted therefrom reach a desired level and is stabilized immediately. Moreover, the amount of light emitted from the lamp 88 being thus stabilized immediately permits the operation to proceed quickly to automatic adjusting control (including the shading correction and gain adjustment) preceding performing of the image reading. Thus, it is possible to put the image reading apparatus 1 in the usable state immediately, with no adverse effect of degraded quality of read image data, and hence, it is possible to reduce a user waiting time before the main power switch is turned on and the apparatus 1 is in the usable state.

Moreover, the temperature sensor S1 (temperature detecting member) whose output voltage varies depending on a detected temperature is provided; the output voltage of the temperature sensor S1 is inputted to the lamp control circuit 99, and the lamp control circuit 99, when recognizing that the temperature detected by the temperature sensor S1 exceeds a predetermined temperature, prevents the lamp 88 from being turned on. With this arrangement, in a case where the lamp 88 is already warmed up, for example when the main power switch is turned on right after it is turned off so as to correct an erroneous state or to reset, so long as the lamp 88 needs not to illuminate for stabilizing light emission when the main power switch is turned on, the lamp control circuit 99, when recognizing that a temperature detected by a temperature detecting member exceeds a predetermined temperature, does not perform control for turning on the lamp 88; thus, it is possible to automatically determine whether such illumination of the lamp 88 when the main power switch is turned on is necessary or not. When the lamp 88 is still warm and the amount of light emitted therefrom is considered to be stabilized, no unnecessary turning-on of the lamp 88 for a purpose of warming-up is not performed when the main power switch is turned on, leading to reduced power consumption.

Here, the predetermined temperature serves as a threshold for the lamp control circuit 99 determining, using a temperature detected by the temperature sensor S1, whether or not the lamp 88 has been cooled, and is determined based on the output voltage of the temperature sensor S1. The temperature sensor S1 does not directly measure a temperature of the lamp 88 and may therefore be replaced with anything that detects a temperature of any other part so long as its temperature can be used for determining that the lamp 88 is cooled since much time has elapsed after the main power is turned off.

The lamp control circuit 99 is provided with the comparator COM, which compares the output voltage Vs of the temperature sensor S1 with the reference voltage Va generated separately so as to determine whether or not the temperature detected by the temperature sensor S1 exceeds the predetermined temperature, and then the lamp control circuit 99 determines, based on a result of the determination made by the comparator COM, whether or not to permit the lamp 88 to be turned on. This makes it possible to automatically determine whether the illumination of the lamp 88 when the main power switch is turned on is necessary or not, and moreover, an architecture for such automatic decision-making can be realized very simply and inexpensively using the comparator COM and the resistors R1 and R2 alone.

The output voltage Vs of the temperature sensor S1 is inputted to the control section 9; after the main power switch is turned on, when the control section 9 is activated, the control section 9, when recognizing that the temperature detected by the temperature sensor S1 exceeds the predetermined temperature (recognizing that the lamp 88, if turned on, can emit the desired amount of light), prevents the lamp 88 from being turned on. This leads to reduced power consumption, with no unnecessary turning-on of the lamp 88 performed by the control section 9.

The temperature sensor S1 is provided with a series circuit including the thermistor and the resistor; a voltage is applied to the series circuit, and from the temperature sensor S1, the voltage across the thermistor and the resistor is obtained as the output voltage Vs. This makes it possible to form the temperature sensor S1 with an extremely simple and easy configuration, leading to reduced costs of manufacturing the image reading apparatus 1.

Moreover, the OR circuit 910 is provided, to which the two signals, namely the lamp control signal of the control section 9 and the lamp control signal of the lamp control circuit 99 are inputted, and the output of the OR circuit 910 is inputted to the lamp operating circuit 95. Thus, there is no need to input those signals to the lamp operating circuit 95, leading to simplified wiring and configuration thereof. That is, this leads to reduced costs of manufacturing the image reading apparatus 1.

Moreover, it is possible to use a cold cathode lamp for the lamp 88. Thus, even in a case where a cold cathode lamp requiring a comparatively long time before an amount of light emitted therefrom is stabilized is used for the lamp 88, it is still possible to make an amount of light emitted therefrom stabilized immediately after the main power switch is turned on. In addition, the cold cathode lamp is less expensive as compared with any other types of lamp; this leads to reduced costs of manufacturing an image reading apparatus.

Second Embodiment

Figure 8:
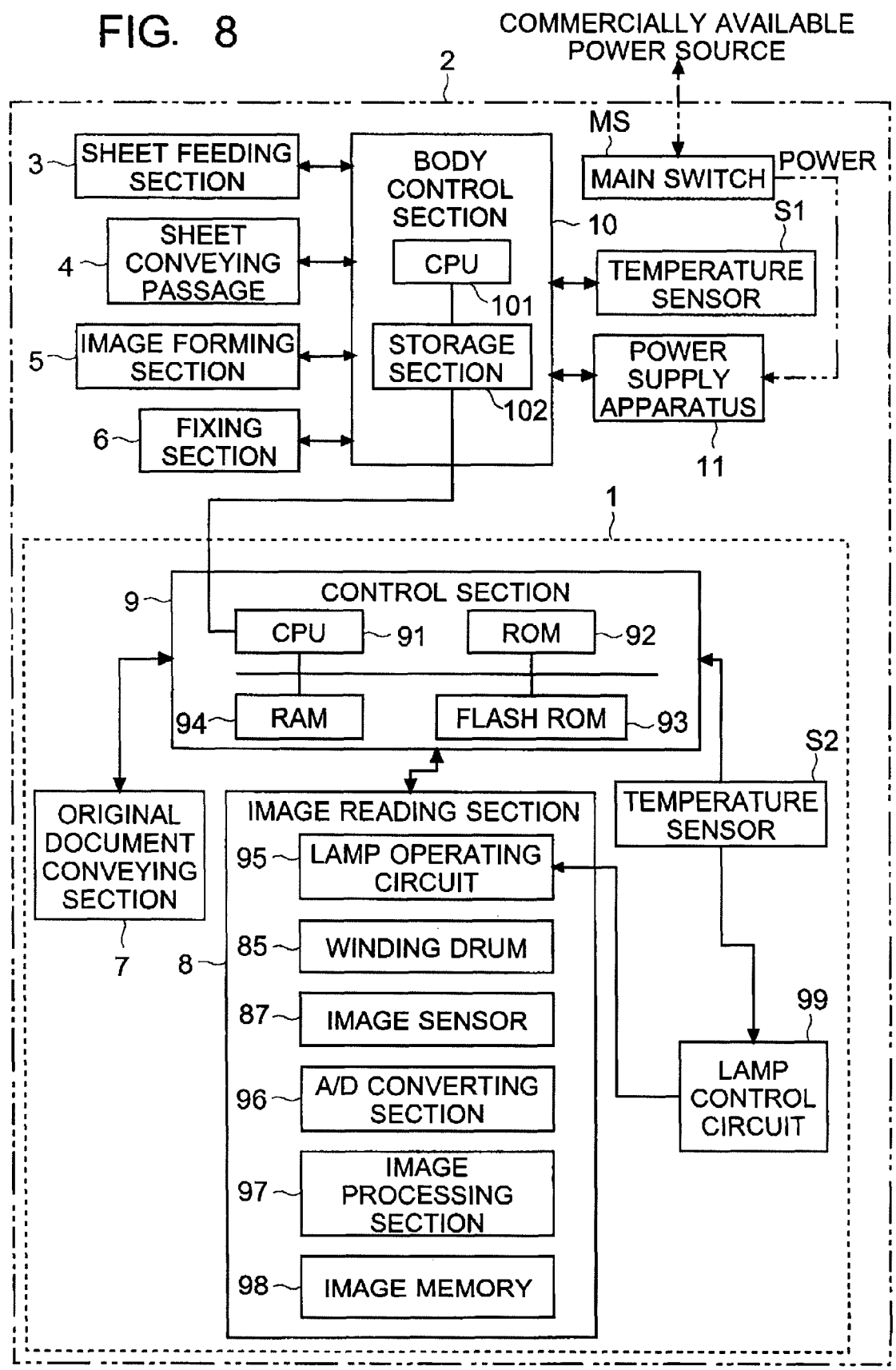
FIG. 8 is a block diagram showing a copier including an image reading apparatus according to a second embodiment.

Next, a second embodiment will be described with reference to FIG. 8. FIG. 8 is a block diagram showing the copier 2 including the image reading apparatus 1 according to the second embodiment. The second embodiment is the same as the first embodiment in every respect except where the temperature sensor is provided; thus, no description of the overlapping parts will be given.

Although in the first embodiment, the temperature sensor S1 is disposed in the vicinity of the fixing section 6, in this embodiment, a temperature sensor S2 is additionally disposed, as shown in FIG. 8, in contact with or in the vicinity of the lamp 88 inside the image reading section 8 thereby to directly measure the temperature of the lamp 88 (see FIG. 3). In this case, as shown in FIG. 8, the temperature sensor S2 outputs the output voltage Vs to the lamp control circuit 99 and the control section 9. Moreover, a voltage value of the reference voltage Va is also different from that in the first embodiment and needs to be adjusted. The temperature sensor S2 may be formed with the same configuration as that of the temperature sensor S1 provided in the fixing section 6 (see FIG. 2).

Further, other embodiment will now be described. The above-described embodiments deal with the example in which a cold cathode lamp is used for the lamp 88; however, even if any other types of lamp including hot cathode lamp, xenon lamp, and halogen lamp are used for the purpose of shining light on an original document, since they, once turned on, need a certain period of time before emitting a desired amount of light, the present invention is applicable to the image reading apparatus 1 using any type of lamp other than the cold cathode lamp.

As described above, the present invention is applicable to image reading apparatuses such as scanner and to image forming apparatuses equipped therewith. Note that the image forming apparatus here is not limited to a copier but includes multi-functional apparatuses called MFP. Moreover, although in the foregoing, the present invention has been described specifically by way of embodiment, this is not intended to limit the scope of the invention, and the present invention may be practiced in any way with various changes made without departing from the spirit of the invention.

What is claimed is:

1. An image reading apparatus comprising:
a lamp shining light on a target original document to be read;
a lamp operating circuit for turning on the lamp;
an image sensor receiving the light shone from the lamp to the original document and then reflected from the original document, for generating image data;
a control section outputting a lamp control signal to the lamp operating circuit thereby to perform control of turning-on and -off of the lamp; and
a lamp control circuit, separate from the control section, outputting a lamp control signal for controlling turning-on and -off of the lamp to the lamp operating circuit and, when a main power switch of the apparatus is turned on, permitting the lamp to be turned on before the control section is activated.

2. The image reading apparatus according to claim 1, further comprising:
a temperature detecting member having an output voltage variable in accordance with a temperature detected thereby,
wherein the output voltage of the temperature detecting member is inputted to the lamp control circuit, and
when the main power switch of the apparatus is turned on, the lamp control circuit, when recognizing that the temperature detected by the temperature detecting member exceeds a predetermined temperature, does not permit the lamp to be turned on.

3. The image reading apparatus according to claim 2,
wherein the lamp control circuit includes a comparator comparing the output voltage of the temperature detecting member with a separately generated reference voltage, and determining whether or not the temperature detected by the temperature detecting member exceeds the predetermined temperature,
wherein the lamp control circuit determines, based on a result of determination so made by the comparator, whether or not to permit the lamp to be turned on.

4. The image reading apparatus according to claim 2,
wherein the output voltage of the temperature detecting member is inputted to the control section, and
when the main power switch of the apparatus is turned on, the control section, when recognizing that the temperature detected by the temperature detecting member exceeds the predetermined temperature, does not permit the lamp to be turned on.

5. The image reading apparatus according to claim 2,
wherein the temperature detecting member is provided with a series circuit including a thermistor and a resistor,
wherein a voltage is applied to the series circuit, and
from the temperature detecting member, a voltage across the thermistor and the resistor is obtained as the output voltage.

6. The image reading apparatus according to claim 3,
wherein the temperature detecting member is provided with a series circuit including a thermistor and a resistor,
wherein a voltage is applied to the series circuit, and
from the temperature detecting member, a voltage across the thermistor and the resistor is obtained as the output voltage.

7. The image reading apparatus according to claim 1, further comprising:
an OR circuit receiving two signals, namely a lamp control signal of the control section and a lamp control signal of the lamp control circuit, wherein an output of the OR circuit is inputted to the lamp operating circuit.

8. The image reading apparatus according to claim 1, wherein the lamp is a cold cathode lamp.

9. An image forming apparatus comprising:

an image reading apparatus including:
- a lamp shining light on a target original document to be read;
- a lamp operating circuit for turning on the lamp;
- an image sensor receiving light shone from the lamp to the original document and reflected from the original document, for generating image data;
- a control section outputting a lamp control signal for controlling turning-on of the lamp to the lamp operating circuit; and
- a lamp control circuit, separate from the control section, outputting a lamp control signal for controlling turning-on and -off of the lamp to the lamp operating circuit and, when a main power switch of the apparatus is turned on, permitting the lamp to be turned on before the control section is activated; and
- a fixing section, provided with a temperature detecting member having an output voltage variable in accordance with a temperature detected thereby, and fixing a toner image transferred on a sheet by being heated and pressed, wherein the output voltage of the temperature detecting member is inputted to the lamp control circuit, and when a main power switch of the apparatus is turned on, the lamp control circuit, when recognizing that the temperature detected by the temperature detecting member exceeds a predetermined temperature, does not permit the lamp to be turned on.

* * * * *